United States Patent
Hirata

(10) Patent No.: US 9,002,618 B2
(45) Date of Patent: Apr. 7, 2015

(54) VARIABLE VALVE TIMING CONTROL APPARATUS FOR ENGINE

(75) Inventor: Yasuo Hirata, Chita-gun (JP)

(73) Assignee: Denso Corporation, Kariya (JP)

( * ) Notice: Subject to any disclaimer, the term of this patent is extended or adjusted under 35 U.S.C. 154(b) by 669 days.

(21) Appl. No.: 13/195,213

(22) Filed: Aug. 1, 2011

(65) Prior Publication Data
US 2012/0046851 A1  Feb. 23, 2012

(30) Foreign Application Priority Data

Aug. 23, 2010  (JP) ................................ 2010-185730

(51) Int. Cl.
| | | |
|---|---|---|
| G06F 19/00 | (2011.01) | |
| G06G 7/70 | (2006.01) | |
| F01L 1/34 | (2006.01) | |
| F02D 13/02 | (2006.01) | |
| F02D 41/00 | (2006.01) | |
| F02D 41/24 | (2006.01) | |
| F02M 25/07 | (2006.01) | |

(52) U.S. Cl.
CPC .............. *F01L 1/34* (2013.01); *F02D 13/0219* (2013.01); *F02D 41/0002* (2013.01); *F02D 41/2438* (2013.01); *F02D 41/2441* (2013.01); *F02D 41/2464* (2013.01); *F02D 2041/001* (2013.01); *F02M 25/0715* (2013.01); *Y02T 10/42* (2013.01); *Y02T 10/18* (2013.01)

(58) Field of Classification Search
USPC ............... 701/102, 103, 105, 114; 123/90.12, 123/90.14–90.18, 347
See application file for complete search history.

(56) References Cited

U.S. PATENT DOCUMENTS

| | | | | | |
|---|---|---|---|---|---|
| 5,289,805 | A | * | 3/1994 | Quinn et al. ................ | 123/90.17 |
| 5,623,896 | A | * | 4/1997 | Kato et al. ................. | 123/90.15 |
| 5,664,528 | A | * | 9/1997 | Kato et al. ................. | 123/90.15 |
| 6,161,511 | A | * | 12/2000 | Hashimoto ................ | 123/90.15 |
| 7,908,074 | B2 | * | 3/2011 | Nishigaki .................... | 701/105 |
| 2001/0004883 | A1 | * | 6/2001 | Tachibana et al. ......... | 123/90.15 |
| 2002/0100442 | A1 | * | 8/2002 | Takahashi et al. ......... | 123/90.17 |

(Continued)

FOREIGN PATENT DOCUMENTS

| | | |
|---|---|---|
| JP | 8-210158 | 8/1996 |
| JP | 3395240 | 2/2003 |

OTHER PUBLICATIONS

Office Action (1 page) dated Mar. 19, 2013 issued in corresponding Japanese Application No. 2010-185730 and English translation (1 page).

(Continued)

*Primary Examiner* — Erick Solis
*Assistant Examiner* — Anthony L Bacon
(74) *Attorney, Agent, or Firm* — Nixon & Vanderhye PC

(57) ABSTRACT

A variable valve timing control apparatus includes a variable valve timing device and a valve timing controller to control the variable valve timing device in a manner that an actual VCT phase coincides with a target VCT phase. When the target VCT phase is set into a predetermined phase, learning means learn the predetermined phase as a reference phase. When determining means determine that there is a learning requirement of the reference phase, enlarging means enlarge an engine operation area where the target VCT phase is set into the reference phase by shifting the target VCT phase to the reference phase in an area where the target VCT phase is close to the reference phase.

20 Claims, 5 Drawing Sheets

(56) References Cited

U.S. PATENT DOCUMENTS

2006/0174854 A1* 8/2006 Yoshizawa .................... 123/348
2009/0055085 A1* 2/2009 Inoue et al. ................... 701/105

OTHER PUBLICATIONS

Office Action (2 pages) dated Jan. 31, 2013 issued in corresponding Japanese Application No, 2010-185730 and English translation (3 pages).

* cited by examiner

VARIABLE VALVE TIMING CONTROL APPARATUS FOR ENGINE

CROSS REFERENCE TO RELATED APPLICATION

This application is based on Japanese Patent Application No. 2010-185730 filed on Aug. 23, 2010, the disclosure of which is incorporated herein by reference in its entirety.

BACKGROUND OF THE INVENTION

1. Field of the Invention

The present invention relates to a variable valve timing control apparatus for an internal combustion engine.

2. Description of Related Art

A variable valve timing device is mounted on an internal combustion engine of a vehicle. The variable valve timing device changes a valve open/close timing of an intake valve or an exhaust valve driven by a camshaft, so as to improve engine output, gas mileage and exhaust emission. A rotation phase of the camshaft is changed with respect to a crankshaft, thereby changing the valve timing. The rotation phase of the camshaft with respect to the crankshaft is defined as a variable cam timing (VCT) phase hereafter. Actual valve timing (VCT phase) is calculated based on a crank angle signal output from a crank sensor and a cam angle signal output from a cam sensor while the engine is active. The variable valve timing device is controlled in a manner that the actual valve timing coincides with a target valve timing.

Manufacture variation or calculation error of the actual VCT phase is required to be corrected. JP-B2-3395240 describes that a reference phase is learned in an operation state where a VCT phase coincides with the reference phase. For example, the reference phase is represented by a most retard position in an engine idling state. An actual VCT phase (e.g., an advance amount from the reference phase) is calculated using the reference phase as a reference.

Recently, Atkinson cycle is introduced to the engine having the variable valve timing device so as to improve both of gas mileage and engine output, so that a variable range of the VCT phase is made larger. The engine becomes less operated in the operation state where the VCT phase coincides with the reference phase, so that a frequency of learning the reference phase is reduced. It may be possible that the reference phase cannot be learned in the operation time of the engine, depending on a driving pattern of the vehicle. In this case, interval between the learning of the reference phase becomes too much long, and the learning of the reference phase may not be performed for a long time. As a result, accuracy for calculating the actual VCT phase and accuracy for controlling the valve timing may be lowered.

SUMMARY OF THE INVENTION

In view of the foregoing and other problems, it is an object of the present invention to provide a variable valve timing control apparatus for an internal combustion engine.

According to an example of the present invention, a variable valve timing control apparatus for an engine includes a variable valve timing device and a valve timing controller. The variable valve timing device changes valve timing of an intake valve or an exhaust valve by changing a rotation phase of a camshaft relative to a crankshaft. The rotation phase of the camshaft is defined as a variable cam timing (VCT) phase. The valve timing controller controls the variable valve timing device in a manner that an actual VCT phase coincides with a target VCT phase. The variable valve timing control apparatus further includes means for learning a reference phase of the target VCT phase; means for determining whether there is a learning requirement of the reference phase; and means for enlarging an operation area where the target VCT phase is set into the reference phase when the determining means determines that there is the learning requirement of the reference phase. The enlarging means change a target VCT phase into the reference phase in an area where the target VCT phase is close to the reference phase so as to enlarge the operation area where the target VCT phase is set into the reference phase.

When it is determined that there is the learning requirement of the reference phase, a target VCT phase is changed into the reference phase in an area where the target phase is close to the reference phase, thereby enlarging an engine operation area where the target phase is set into the reference phase. Therefore, a chance to learn the reference phase is increased. Thus, accuracy for calculating the actual VCT phase is maintained high, and accuracy for controlling the valve timing can be maintained high.

For example, the determining means determine that there is the learning requirement of the reference phase when the reference phase is not learned in a last engine operation time and when the learning of the reference phase is not finished in a present engine operation time. At this time, the chance to learn the reference phase is increased.

For example, the determining means determine that there is the learning requirement of the reference phase every time when a predetermined period is elapsed in a state where the reference phase is not learned in an engine operation time. Thus, the chance to learn the reference phase is increased.

For example, the determining means determine that there is the learning requirement of the reference phase every time when a temperature of cooling water is raised by a predetermined value in a state where the reference phase is not learned in an engine operation time. Thus, the chance to learn the reference phase is increased.

By the way, when the target VCT phase is changed, a combustion state of the engine may become worse because intake air amount of the engine is changed. However, the enlarging means control an actuator other than the variable valve timing device having the changed target VCT phase so as to cancel the change in combustion state of the engine. Thus, the combustion state is restricted from becoming worse.

For example, the variable valve timing device is respectively provided to the exhaust valve and the intake valve. When the target VCT phase of the variable valve timing device of the intake valve is changed, the enlarging means control at least one of the variable valve timing device of the exhaust valve, an exhaust gas recirculation device, and a throttle device. When the target VCT phase of the variable valve timing device of the exhaust valve is changed, the enlarging means control at least one of the variable valve timing device of the intake valve, the exhaust gas recirculation device, and the throttle device. Thus, the combustion state is restricted from becoming worse.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1:
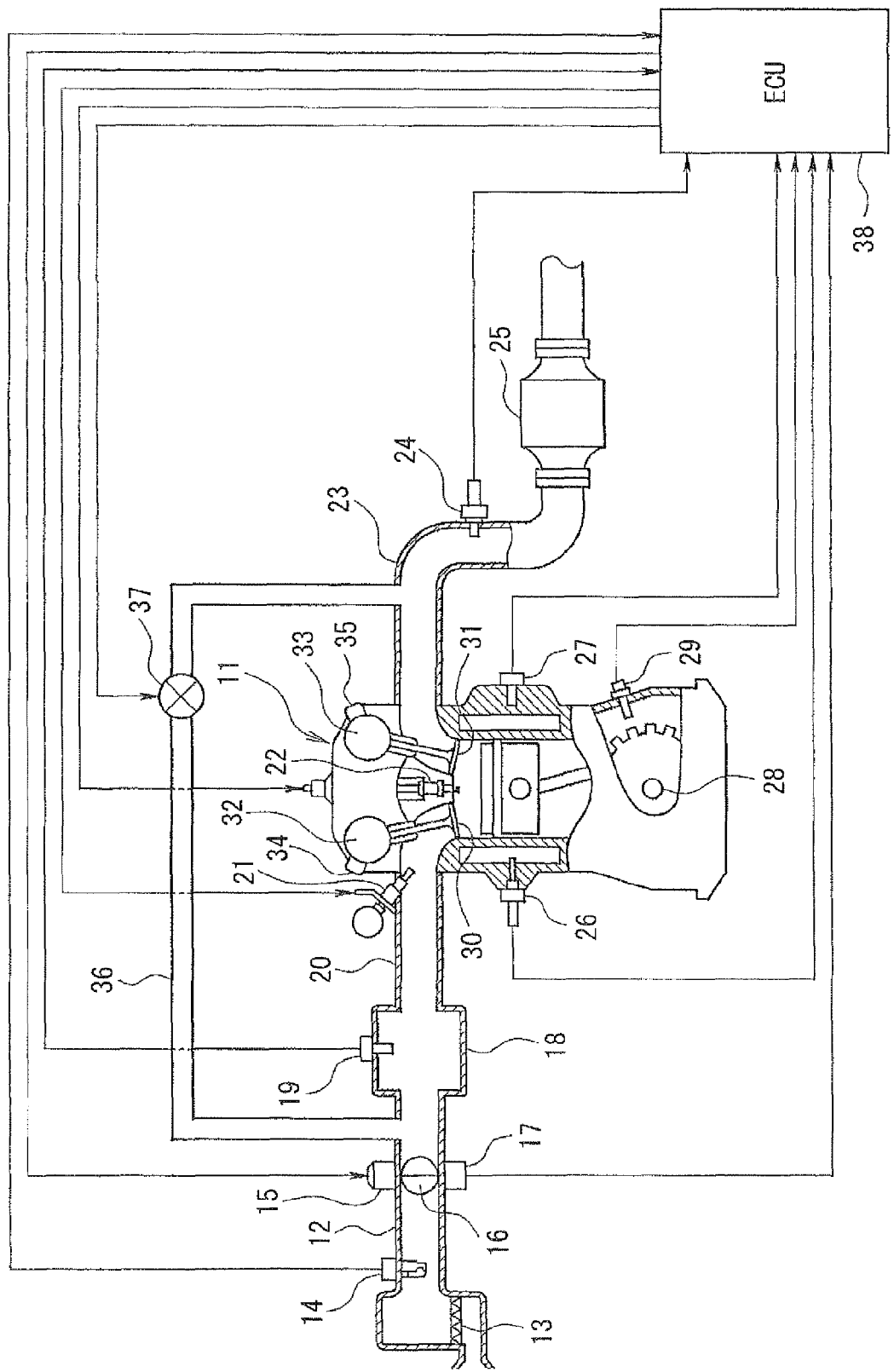
FIG. 1 is a schematic view illustrating an engine control system according to a first embodiment.

A first embodiment is described with reference to FIGS. 1-3. As shown in FIG. 1 that illustrates an engine control system, an air cleaner 13 is arranged at the most upstream of an intake pipe 12 of an engine 11. An air flow meter 14 is arranged downstream of the air cleaner 13, and detects a flow rate of intake air. A throttle valve 16 and a throttle opening sensor 17 are arranged downstream of the air flow meter 14. An opening degree of the throttle valve 16 is controlled by a motor 15. The sensor 17 detects a throttle opening of the valve 16. A throttle device is constructed by the motor 15, the valve 16 and the sensor 17.

A surge tank 18 is arranged downstream of the throttle valve 16, and has a pressure sensor 19 to detect a pressure of the intake pipe 12. An intake manifold 20 is provided to the tank 18, and introduces air into each cylinder of the engine 11. A fuel injection valve 21 is mounted adjacent to an intake port of the intake manifold 20, and injects fuel toward the intake port. An ignition plug 22 is mounted to each cylinder head of the engine 11, and air-fuel mixture is ignited by spark discharge of the plug 22.

An exhaust gas sensor 24 is mounted to an exhaust pipe 23 of the engine 11. For example, the sensor 24 may be air-fuel ratio sensor or oxygen sensor. The sensor 24 detects air-fuel ratio of exhaust gas between rich and lean. A catalyst 25 such as ternary catalyst is provided downstream of the sensor 24, and purifies exhaust gas.

The engine 11 has a variable valve timing device 32 to change a valve open/close timing of an intake valve 30, and a variable valve timing device 33 to change a valve open/close timing of an exhaust valve 31. The device 32, 33 is driven by oil pressure or electricity. The timing device 32 of the intake valve 30 changes a rotation phase (intake VCT phase) of intake-side camshaft (not shown) with respect to a crankshaft 28 using oil pressure or electric motor. Therefore, the valve timing of the intake valve 30 is changed by the intake-side camshaft. The timing device 33 of the exhaust valve 31 changes a rotation phase (exhaust VCT phase) of exhaust-side camshaft (not shown) with respect to the crankshaft 28 using oil pressure or electric motor. Therefore, the valve timing of the exhaust valve 31 is changed by the exhaust-side camshaft.

An intake-side cam sensor 34, an exhaust-side cam sensor 35 and a crank sensor 29 are mounted to the engine 11. The sensor 34 outputs a cam angle signal in synchronization with a rotation of the intake-side camshaft. The sensor 35 outputs a cam angle signal in synchronization with a rotation of the exhaust-side camshaft. The sensor 29 outputs a pulse of crank angle signal in synchronization with a rotation of the crankshaft 28 by every predetermined crank angle such as 30° CA. Crank angle and engine rotation speed are detected based on the signal output from the sensor 29. An actual valve timing (actual intake VCT phase) of the intake valve 30 is detected based on the signals output from the sensors 29, 34. An actual valve timing (actual exhaust VCT phase) of the exhaust valve 31 is detected based on the signals output from the sensors 29, 35. Further, a cooling water temperature sensor 26 and a knock sensor 27 are mounted to each cylinder block of the engine 11. The sensor 26 detects a temperature of cooling water. The knock sensor 27 detects a knocking.

An exhaust gas recirculation (EGR) pipe 36 is arranged in the engine 11 so as to extend from the exhaust pipe 23 to a downstream of the throttle valve 16 in the intake pipe 12, so that a part of exhaust gas is returned to the intake side. An EGR valve 37 is arranged in the pipe 36, and controls an amount of EGR gas. An EGR device is constructed by the pipe 36 and the valve 37.

Signals output from the sensors are input into an electronic control unit 38 (ECU). The ECU 38 has a microcomputer as a main, and controls fuel injection amount, ignition timing, throttle opening (intake air amount), for example, in accordance with engine operation state by executing a program memorized in an internal ROM.

The ECU 38 to execute a valve timing control routine (not shown) may correspond to a valve timing controller. The ECU 38 controls the timing device 32 in a manner that the actual valve timing of the intake valve 30 coincides with a target valve timing (target intake VCT phase) corresponding to engine operation state. At that time, the actual intake VCT phase such as advance amount from a reference phase is calculated based on the signals output from the sensors 29, 34.

Figure 2:
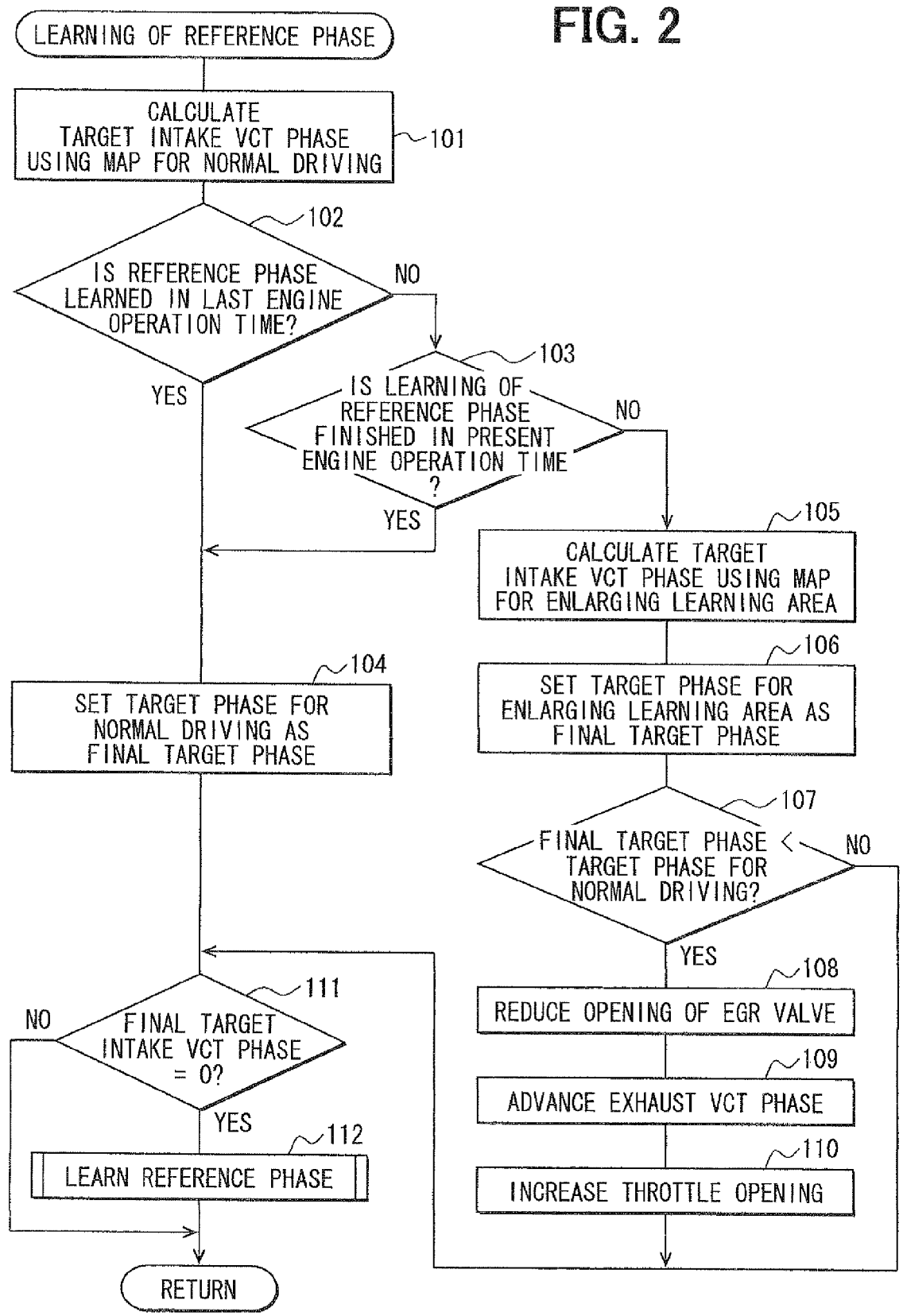
FIG. 2 is a flow chart illustrating a routine of learning a reference phase of the first embodiment.
Figure 3:
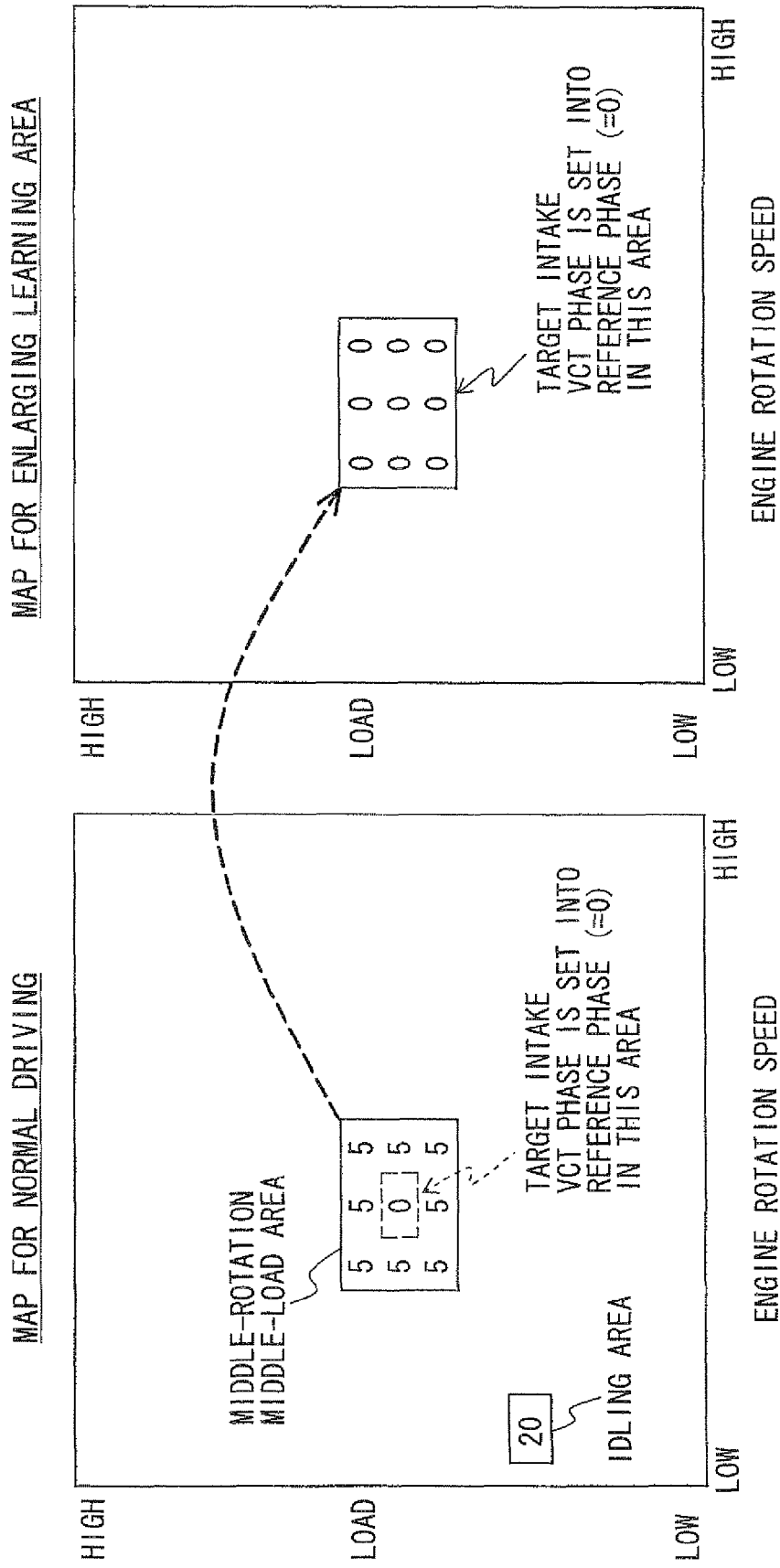
FIG. 3 is map of target intake VCT phase for normal driving and for enlarging a learning area.

Further, the ECU 38 executes a routine of learning the reference phase of FIG. 2. When the target intake VCT phase is set into a predetermined reference phase such as most retard phase, the reference phase is learned. However, if a frequency of learning the reference phase is low, interval between the learning of the reference phase becomes too much long, and the learning of the reference phase may not be performed for a long time. In this case, accuracy for calculating the actual intake VCT phase may be lowered, and accuracy for controlling the valve timing may be lowered.

According to the first embodiment, the ECU 38 determines whether there is a learning requirement of the reference phase. If it is determined that there is a learning requirement of the reference phase, a learning area where the target intake VCT phase is set into the reference phase is enlarged, by changing a target intake VCT phase that is close to the reference phase into the reference phase. Thus, the operation area where the learning of the reference phase is performed is enlarged. That is, a chance to learn the reference phase is increased, and a predetermined frequency for learning the reference phase is secured.

In the first embodiment, the learning requirement of the reference phase is determined to exist, when the reference phase is not learned in a last engine operation time, and when the learning of the reference phase is not completed in a present engine operation time. An engine operation area where the learning of the reference phase can be executed is enlarged by enlarging an area where the target intake VCT phase is set into the reference phase.

The routine of learning the reference phase is performed by the ECU 38. The routine shown in FIG. 2 is repeatedly performed with a predetermined cycle while the ECU 38 is active. When the routine is activated, a target intake VCT phase for normal driving is calculated in accordance with an engine operation state at Step 101. For example, the target intake VCT phase for normal driving is calculated based on engine rotation speed and load by referring to a map of the target intake VCT phase for normal driving shown in FIG. 3.

In the map for normal driving, the target phase is set in accordance with engine rotation speed and load. In a predetermined operation area such as middle-rotation and middle-load operation area, the target phase is set into a predetermined reference phase. For example, the predetermined reference phase may be a most retard position represented by 0 in FIG. 3. In an idling area of FIG. 3, the target phase is set on the advance side represented by 20 from the predetermined reference phase.

At Step 102, it is determined whether the reference phase is learned in the last engine operation time. If it is determined that the reference phase is learned in the last engine operation time at Step 102, the target phase for normal driving is set as a final target intake VCT phase at Step 104.
[Final Target Intake VCT Phase=Target Intake VCT Phase for Normal Driving]

If it is determined that the reference phase is not learned in the last engine operation time at Step 102, it is determined whether the learning of the reference phase is finished in the present engine operation time at Step 103. If it is determined that the learning of the reference phase is finished in the present engine operation time at Step 103, the target phase for normal driving is set as a final target intake VCT phase at Step 104.
[Final Target Intake VCT Phase=Target Intake VCT Phase for Normal Driving]

It is determined whether the final target phase is set into the reference phase at Step 111. If it is determined that the final target phase is set into the reference phase at Step 111, the reference phase is learned at Step 112. For example, the variable valve timing device 32 is controlled in a manner that the actual intake VCT phase is compulsorily changed into a limitation position such as most retard phase in a mechanical movable range of the device 32. At this time, a rotation phase of the intake-side camshaft with respect to the crankshaft 28 is memorized in nonvolatile memory as a reference phase. The memory is a rewritable backup RAM (not shown) of the ECU 38, for example, and data is held in the memory while the ECU 38 is not active. Step 112 may correspond to means for learning the reference phase.

In contrast, if it is determined that the reference phase is not learned in the last engine operation time at Step 102, and if it is determined that the learning of the reference phase is not finished in the present engine operation time at Step 103, it is determined that there is a learning requirement of the reference phase, and Step 105 is performed. That is, a target intake VCT phase for enlarging the learning area is calculated in accordance with an engine operation state (e.g., engine rotation speed and load) by referring to a map of the target intake VCT phase for enlarging the learning area shown in FIG. 3.

In the map for enlarging the learning area, the target phase of the middle-rotation and middle-load operation area is changed into the reference phase represented by 0, while the target phase is represented by 5 in the map for normal driving. That is, a target phase, that is close to or in a predetermined area from the reference phase in the map for normal driving, is changed into the reference phase. Therefore, the operation area where the target phase is set into the reference phase is enlarged, so that the learning of the reference phase becomes easy to be performed.

The enlarging of the engine operation area where the target VCT phase is set into the reference phase is performed when a difference between the target VCT phase and the reference phase is equal to or smaller than a predetermined value.

Then, the target phase for enlarging the learning area is set as a final target intake VCT phase at Step 106.
[Final Target Intake VCT Phase=Target Intake VCT Phase for Enlarging Learning Area]

Then, it is determined whether the target phase is changed at Step 107. Specifically, it is determined whether the final target phase (=target phase for enlarging the learning area) is located on the retard side from the target phase for normal driving.

If it is determined that the final target phase is located on the retard side from the target phase for normal driving (that is, if it is determined that the target phase is changed) at Step 107, intake air amount of the engine 11 may be reduced, due to the change in the target phase, so that the combustion state may become worse. Therefore, actuator other than the timing device 32 of the intake valve 30 (e.g., the EGR device, the timing device 33 of the exhaust valve 31, and the throttle device) is controlled as follows, so as to cancel the change in the combustion state.

At Step 108, an opening of the EGR valve 37 is corrected into a reducing direction, so that outside EGR amount is reduced and that the intake air amount is increased. In this case, the correction amount in the opening of the EGR valve 37 is calculated using a map or formulation in accordance with a difference between the final target phase and the target phase for normal driving.

At Step 109, the exhaust VCT phase (valve timing of the exhaust valve 31) is corrected into an advance direction, so that inside EGR amount is reduced and that the intake air amount is increased. In this case, the correction amount of the exhaust VCT phase is calculated using a map or formulation in accordance with a difference between the final target phase and the target phase for normal driving.

At Step 110, the throttle opening is corrected into an increasing direction, so that the intake air amount is increased. In this case, the correction amount of the throttle opening is calculated using a map or formulation in accordance with a difference between the final target phase and the target phase for normal driving.

Step 102 and Step 103 may correspond to means for determining an existence of a learning requirement. Step 105-110 may correspond to means for enlarging a learning area.

Then, it is determined whether the final target phase is set into the reference phase at Step 111. If it is determined that the final target phase is set into the reference phase at Step 111, the reference phase is learned at Step 112.

According to the first embodiment, if the reference phase is not learned in the last engine operation time, and if the learning of the reference phase is not finished in the present engine operation time, it is determined that there is a learning requirement of the reference phase. Then, a target phase that is close to the reference phase is changed into the reference phase. Therefore, the operation area where the target phase is set into the reference phase is enlarged, so that the learning of the reference phase becomes easy to be performed. Thus, accuracy for calculating the actual VCT phase can be maintained high, and accuracy for controlling the valve timing can be maintained high.

Further, the actuator other than the timing device 32 of the intake valve 30 (e.g., the EGR device, the timing device 33 of the exhaust valve 31, and the throttle device) is controlled so as to cancel the change in the combustion state. Therefore, even when the target phase is changed, the combustion state of the engine 11 can be prevented from becoming worse, so that accidental fire and lowering in engine output can be prevented from being generated.

Second Embodiment

A second embodiment will be described with reference to FIG. 4. Substantially the same parts as the first embodiment are omitted or simplified, and description is performed relative to parts different from the first embodiment.

Figure 4:
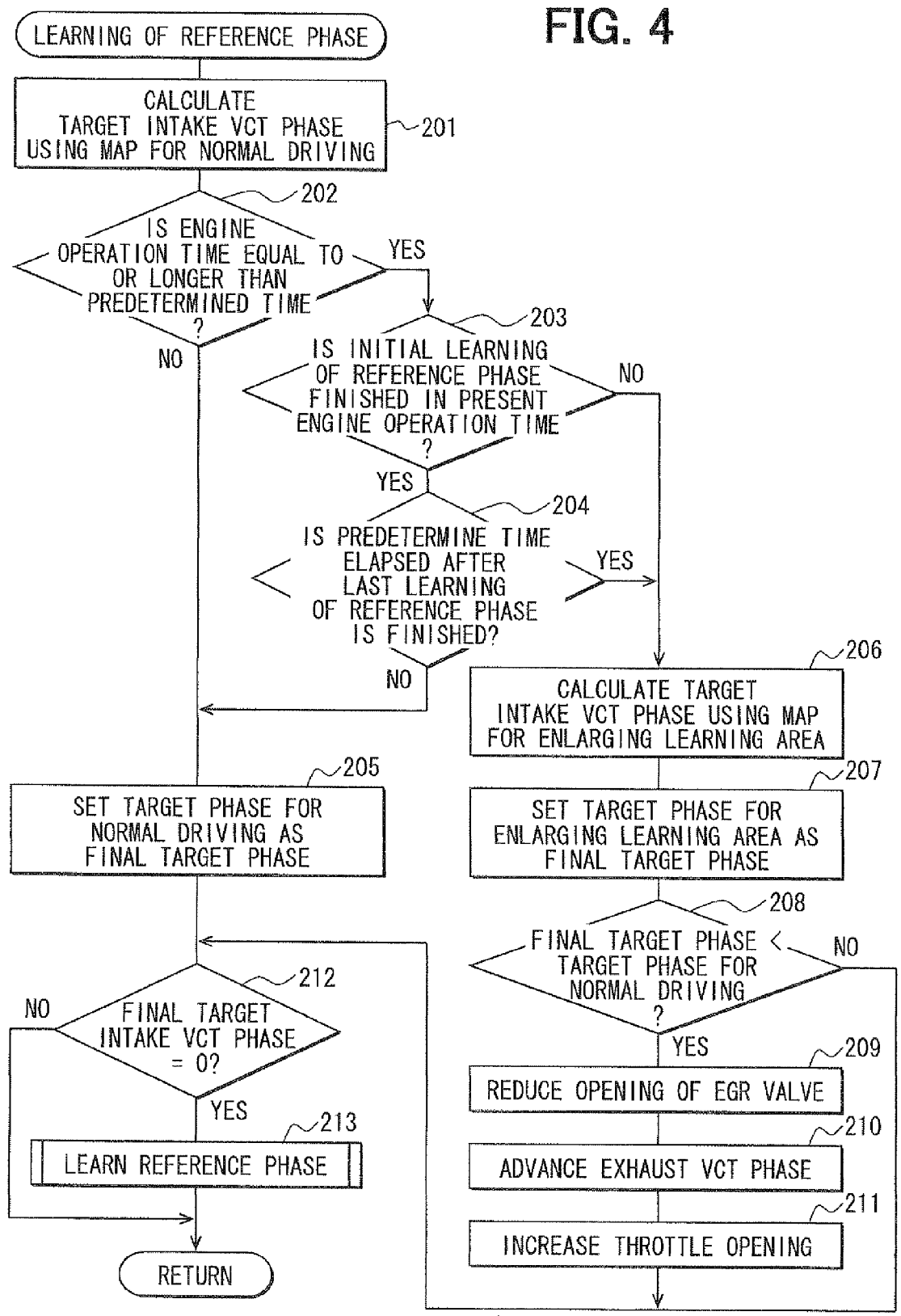
FIG. 4 is a flow chart illustrating a routine of learning a reference phase according to a second embodiment.

In the second embodiment, the ECU 38 executes a routine of learning a reference phase shown in FIG. 4. Every time when a predetermined period is elapsed in a state where the reference phase is not learned in an engine-operated time, it is determined that there is a learning requirement of the reference phase. An engine operation area where the target intake VCT phase is set into the reference phase is enlarged, so that an engine operation area where the learning of the reference phase is performed is enlarged.

As shown in FIG. 4, a target intake VCT phase for normal driving is calculated in accordance with an engine operation state at Step 201. For example, the target intake VCT phase for normal driving is calculated based on engine rotation speed and load by referring to a map of the target intake VCT phase for normal driving shown in FIG. 3.

At Step 202, it is determined whether an engine operation time is equal to or longer than a predetermined period. The engine operation time represents a time elapsed after the engine is activated. If it is determined that the engine operation time is shorter than the predetermined period at Step 202, the target phase for normal driving is set as a final target intake VCT phase at Step 205.
[Final Target Intake VCT Phase=Target Intake VCT Phase for Normal Driving]

If it is determined that the engine operation time is equal to or longer than the predetermined period at Step 202, it is determined whether an initial learning of the reference phase is finished in the present engine operation time at Step 203. If it is determined that the initial learning of the reference phase is finished in the present engine operation time at Step 203, it is determined whether a predetermined time is elapsed after the last learning of the reference phase is finished at Step 204.

If it is determined that the predetermined time is not elapsed after the last learning of the reference phase is finished at Step 204, that is if a time elapsed after the last learning of the reference phase is finished is shorter than the predetermined time, the target phase for normal driving is set as a final target phase at Step 205.
[Final Target Intake VCT Phase=Target Intake VCT Phase for Normal Driving]

It is determined whether the final target phase is set into the reference phase at Step 212. If it is determined that the final target phase is set into the reference phase at Step 212, the reference phase is learned at Step 213.

In contrast, if it is determined that the initial learning of the reference phase is not finished in the present engine operation time at Step 203, or if it is determined that the predetermined time is elapsed after the last learning of the reference phase is finished at Step 204, it is determined that there is a learning requirement of the reference phase, and Step 206 is performed. That is, a target intake VCT phase for enlarging the learning area is calculated in accordance with an engine operation state (e.g., engine rotation speed and load) by referring to a map of the target intake VCT phase for enlarging the learning area shown in FIG. 3.

Alternatively, it is determined whether a predetermined time is elapsed in a state where the reference phase is not learned at Step 204.

Then, the target phase for enlarging the learning area is set as a final target intake VCT phase at Step 207.
[Final Target Intake VCT Phase=Target Intake VCT Phase for Enlarging Learning Area]

Then, it is determined whether the final target phase (=target phase for enlarging the learning area) is located on the retard side from the target phase for normal driving at Step 208.

If it is determined that the final target phase is located on the retard side from the target phase for normal driving (that is, if it is determined that the target phase is changed) at Step 208, actuator other than the timing device 32 of the intake valve 30 (e.g., the EGR device, the timing device 33 of the exhaust valve 31, and the throttle device) is controlled so as to cancel the change in the combustion state of the engine 11 at Step 209-211, because the change in the combustion state is generated by the change in the target intake VCT phase.

Then, it is determined whether the final target phase is set into the reference phase at Step 212. If it is determined that the final target phase is set into the reference phase at Step 212, the reference phase is learned at Step 213.

According to the second embodiment, every time when a predetermined period is elapsed in a state where the reference phase is not learned in an engine operation time, it is determined that there is a learning requirement of the reference phase. The operation area where the target intake VCT phase is set into the reference phase is enlarged, so that the operation area where the learning of the reference phase is performed is enlarged. Thus, a predetermined frequency for learning the reference phase can be secured.

Third Embodiment

A third embodiment will be described with reference to FIG. 5. Substantially the same parts as the first embodiment are omitted or simplified, and description is performed relative to parts different from the first embodiment.

Figure 5:
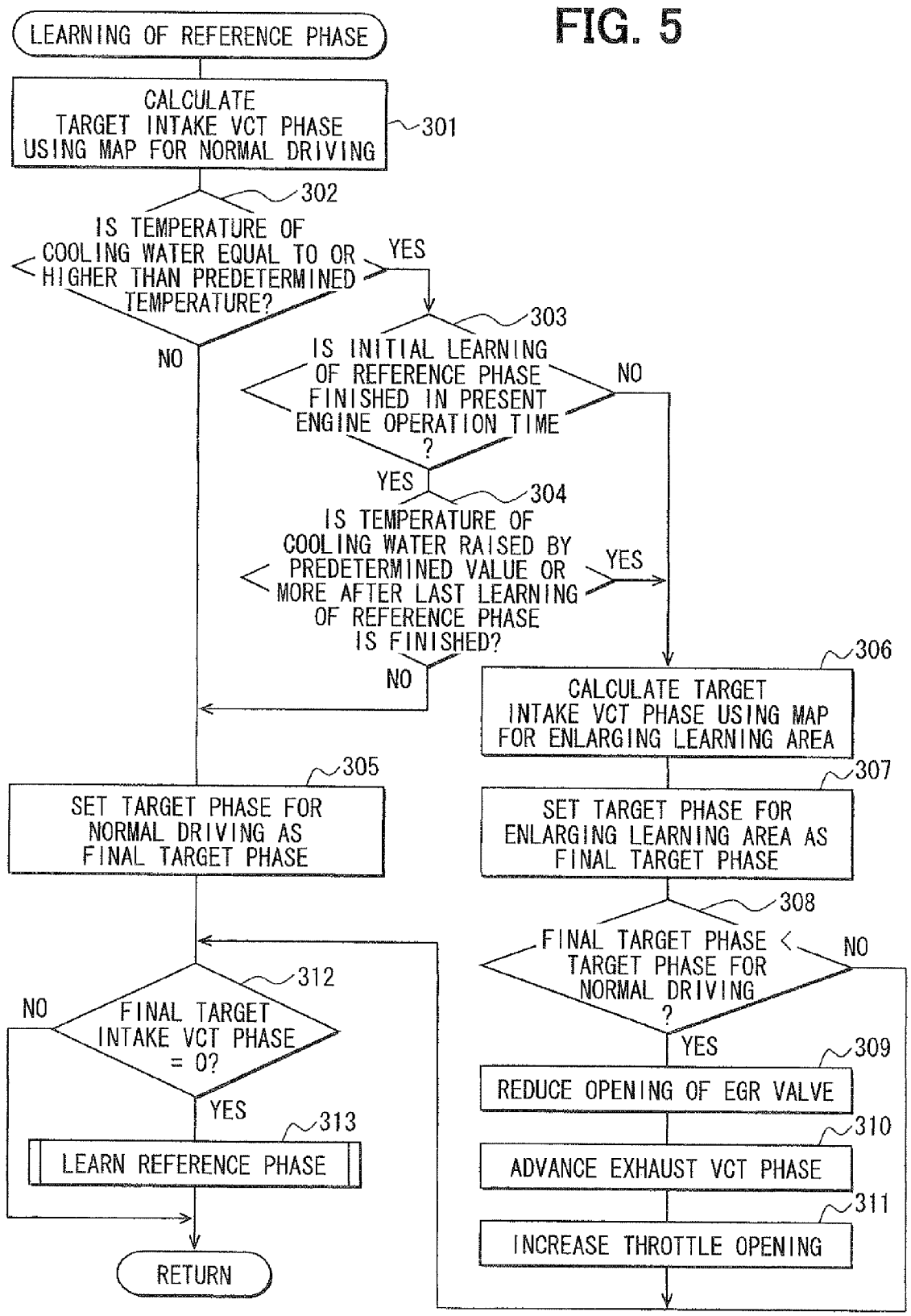
FIG. 5 is a flow chart illustrating a routine of learning a reference phase according to a third embodiment.

In the third embodiment, the ECU 38 executes a routine of learning a reference phase shown in FIG. 5. Every time when a temperature of cooling water is raised by a predetermined value or more in a state where the reference phase is not learned in an engine operation time, it is determined that there is a learning requirement of the reference phase. An operation area where the target intake VCT phase is set into the reference phase is enlarged, so that an operation area where the learning of the reference phase is performed is enlarged.

As shown in FIG. 5, a target intake VCT phase for normal driving is calculated in accordance with an engine operation state at Step 301. For example, the target intake VCT phase for normal driving is calculated based on engine rotation speed and load by referring to a map of the target intake VCT phase for normal driving shown in FIG. 3.

At Step 302, it is determined whether a temperature of cooling water is equal to or higher than a predetermined value such as 40° C. If it is determined that the temperature of cooling water is lower than the predetermined value at Step 302, the target phase for normal driving is set as a final target intake VCT phase at Step 305.
[Final Target Intake VCT Phase=Target Intake VCT Phase for Normal Driving]

If it is determined that the temperature of cooling water is equal to or higher than the predetermined value at Step 302, it is determined whether an initial learning of the reference phase is finished in the present engine operation time at Step 303. If it is determined that the initial learning of the reference phase is finished in the present engine operation time at Step 303, it is determined whether the temperature of cooling water is raised by a predetermined value or more such as 10-20° C. after the last learning of the reference phase is finished at Step 304.

If it is determined that the temperature of cooling water is not raised by the predetermined value after the last learning of the reference phase is finished at Step 304, the target phase for normal driving is set as a final target intake VCT phase at Step 305.

[Final Target Intake VCT Phase=Target Intake VCT Phase for Normal Driving]

It is determined whether the final target phase is set into the reference phase at Step 312. If it is determined that the final target phase is set into the reference phase at Step 312, the reference phase is learned at Step 313.

In contrast, if it is determined that the initial learning of the reference phase is not finished in the present engine operation time at Step 303, or if it is determined that the temperature of cooling water is raised by the predetermined value after the last learning of the reference phase is finished at Step 304, it is determined that there is a learning requirement of the reference phase, and Step 306 is performed. That is, a target intake VCT phase for enlarging the learning area is calculated in accordance with an engine operation state (e.g., engine rotation speed and load) by referring to a map of the target intake VCT phase for enlarging the learning area shown in FIG. 3.

Alternatively, it is determined whether the temperature of cooling water is raised by the predetermined value or more in a state where the reference phase is not learned at Step 304.

Then, the target phase for enlarging the learning area is set as a final target intake VCT phase at Step 307.

[Final Target Intake VCT Phase=Target Intake VCT Phase for Enlarging Learning Area]

Then, it is determined whether the final target phase target phase for enlarging the learning area) is located on the retard side from the target phase for normal driving at Step 308.

If it is determined that the final target phase is located on the retard side from the target phase for normal driving (that is, if it is determined that the target phase is changed) at Step 308, actuator other than the timing device 32 of the intake valve 30 (e.g., the EGR device, the timing device 33 of the exhaust valve 31, and the throttle device) is controlled so as to cancel the change in the combustion state of the engine 11 at Step 309-311.

Then, it is determined whether the final target phase is set into the reference phase at Step 312. If it is determined that the final target phase is set into the reference phase at Step 312, the reference phase is learned at Step 313.

According to the third embodiment, every time when a temperature of cooling water is raised by a predetermined value in a state where the reference phase is not learned in an engine operation time, it is determined that there is a learning requirement of the reference phase. An operation area where the target intake VCT phase is set into the reference phase is enlarged, so that an operation area where the learning of the reference phase is performed is enlarged. Thus, a predetermined frequency for learning the reference phase can be secured.

Other Embodiment

A method of determining the existence of the learning requirement is not limited to the above examples. Alternatively, every time when one of driving distance, intake air amount accumulation value, fuel injection amount accumulation value, ignition number accumulation value, and rotation speed accumulation value is increased by a predetermined value in a state where the reference phase is not learned in an engine operation time, it may be determined that there is a learning requirement of the reference phase.

In the first to third embodiments, the actuator other than the timing device 32 of the intake valve 30, that is the EGR device, the timing device 33 of the exhaust valve 31, and the throttle device are controlled so as to cancel the change in the combustion state of the engine 11. Alternatively, one or two of the EGR device, the timing device 33 of the exhaust valve 31, and the throttle device may be controlled so as to cancel the change in the combustion state of the engine 11. Further, in a system having a variable valve lift device and a supercharger, at least one of the EGR device, the timing device 33 of the exhaust valve 31, the throttle device, the variable valve lift device, and the supercharger may be controlled so as to cancel the change in the combustion state of the engine 11.

The present invention may be applied to the variable valve timing device 33 of the exhaust valve 31 in place of the variable valve timing device 32 of the intake valve 30. When it is determined that there is a learning requirement of the reference phase, an operation area where a target exhaust VCT phase is set into the reference phase is enlarged by changing a target exhaust VCT phase adjacent to the reference phase into the reference phase. Further, at least one of the EGR device, the timing device 32 of the intake valve 30, the throttle device, the variable valve lift device, and the supercharger may be controlled so as to cancel the change in the combustion state of the engine 11, when the change in the combustion state is generated by the change in the target exhaust VCT phase.

When the target intake VCT phase or the target exhaust VCT phase is changed, torque variation of the engine 11 may be reduced by controlling torque.

The present invention is not limited to the intake port injection type engine of FIG. 1. The present invention may be applied to a cylinder injection type engine, or a dual injection type engine including both of the intake port injection type fuel injection valve and the cylinder injection type fuel injection valve.

Such changes and modifications are to be understood as being within the scope of the present invention as defined by the appended claims.

What is claimed is:

1. A variable valve timing control apparatus for an engine comprising:
 a variable valve timing device to change valve timing of an intake valve or an exhaust valve by changing a rotation phase of a camshaft relative to a crankshaft, the rotation phase of the camshaft being defined as a variable cam timing (VCT) phase;
 a valve timing controller to control the variable valve timing device in a manner that an actual VCT phase coincides with a target VCT phase;
 means for learning a reference phase when the target VCT phase is set into a predetermined phase corresponding to the reference phase;
 means for determining whether there is a learning requirement of the reference phase; and
 means for enlarging an engine operation area where the target VCT phase is set into the reference phase by shifting the target VCT phase to the reference phase in an area where the target VCT phase is close to the reference phase when the determining means determine that there is the learning requirement of the reference phase;
 wherein the determining means whether there is the learning requirement of the reference phase based on a learning state of the reference phase.

2. The variable valve timing control apparatus according to claim 1, wherein
 the determining means determine that there is the learning requirement of the reference phase when the reference phase is not learned in a last engine operation time and when the learning of the reference phase is not finished in a present engine operation time.

3. The variable valve timing control apparatus according to claim 1, wherein
the determining means determine that there is the learning requirement of the reference phase every time when a predetermined period is elapsed in a state where the reference phase is not learned in an engine operation time.

4. The variable valve timing control apparatus according to claim 1, wherein
the determining means determine that there is the learning requirement of the reference phase every time when a temperature of cooling water is raised by a predetermined value in a state where the reference phase is not learned in an engine operation time.

5. The variable valve timing control apparatus according to claim 1, wherein
the shifting of the target VCT phase to the reference phase causes a change in combustion state of the engine, and
the enlarging means control an actuator other than the variable valve timing device having the shifted target VCT phase so as to cancel the change in combustion state of the engine.

6. The variable valve timing control apparatus according to claim 5, further comprising:
an exhaust gas recirculation device; and a throttle device, wherein
the variable valve timing device is provided to the exhaust valve and the intake valve respectively,
the enlarging means control at least one of the variable valve timing device of the exhaust valve, the exhaust gas recirculation device, and the throttle device when the target VCT phase of the variable valve timing device of the intake valve is shifted, and
the enlarging means control at least one of the variable valve timing device of the intake valve, the exhaust gas recirculation device, and the throttle device when the target VCT phase of the variable valve timing device of the exhaust valve is shifted.

7. The variable valve timing control apparatus according to claim 1, wherein
the enlarging of the engine operation area where the target VCT phase is set into the reference phase is performed when a difference between the target VCT phase and the reference phase is equal to or smaller than a predetermined value.

8. The variable valve timing control apparatus according to claim 1, wherein
the target VCT phase is set in accordance with an operation state of the engine.

9. The variable valve timing control apparatus according to claim 1 further comprising:
means for changing the target VCT phase to the reference phase, wherein
the changing means change the target VCT phase to the reference phase when the determining means determine that there is the learning requirement of the reference phase, and
the learning means learn the reference phase when the changing means change the target VCT phase to the reference phase.

10. The variable valve timing control apparatus according to claim 9 further comprising:
means for determining whether a condition for permitting a learning of the reference phase is met by determining whether the target VCT phase is changed to the reference phase, wherein the learning means executes a learning of the reference phase when the condition for permitting a learning of the reference phase is met and when there is the learning requirement of the reference phase.

11. A variable valve timing control apparatus for an engine comprising:
a variable valve timing device to change valve timing of an intake valve or an exhaust valve by changing a rotation phase of a camshaft relative to a crankshaft, the rotation phase of the camshaft being defined as a variable cam timing (VCT) phase; and
an electronic control unit, comprising a computer, the electronic control unit being configured to at least:
control the variable valve timing device in a manner that an actual VCT phase coincides with a target VCT phase;
learn a reference phase when the target VCT phase is set into a predetermined phase corresponding to the reference phase;
determine whether there is a learning requirement of the reference phase based on a learning state of the reference phase; and
enlarge an engine operation area where the target VCT phase is set into the reference phase by shifting the target VCT phase to the reference phase in an area where the target VCT phase is close to the reference phase when a determination is made that there is the learning requirement of the reference phase.

12. The variable valve timing control apparatus according to claim 11, wherein the electronic control unit is further configured to at least determine that there is the learning requirement of the reference phase when the reference phase is not learned in a last engine operation time and when the learning of the reference phase is not finished in a present engine operation time.

13. The variable valve timing control apparatus according to claim 11, wherein the electronic control unit is further configured to determine that there is the learning requirement of the reference phase every time when a predetermined period is elapsed in a state where the reference phase is not learned in an engine operation time.

14. The variable valve timing control apparatus according to claim 11, wherein the electronic control unit is further configured to determine that there is the learning requirement of the reference phase every time when a temperature of cooling water is raised by a predetermined value in a state where the reference phase is not learned in an engine operation time.

15. The variable valve timing control apparatus according to claim 11, wherein
the shifting of the target VCT phase to the reference phase causes a change in combustion state of the engine, and
the electronic control unit is further configured to control an actuator other than the variable valve timing device having the shifted target VCT phase so as to cancel the change in combustion state of the engine.

16. The variable valve timing control apparatus according to claim 15, further comprising:
an exhaust gas recirculation device; and a throttle device, wherein
the variable valve timing device is provided to the exhaust valve and the intake valve respectively,
the electronic control unit is further configured to control at least one of the variable valve timing device of the exhaust valve, the exhaust gas recirculation device, and the throttle device when the target VCT phase of the variable valve timing device of the intake valve is shifted, and the electronic control unit is further configured to control at least one of the variable valve timing device of the intake valve, the exhaust gas recirculation device, and the throttle device when the target VCT phase of the variable valve timing device of the exhaust valve is shifted.

17. The variable valve timing control apparatus according to claim 11, wherein the enlarging of the engine operation area where the target VCT phase is set into the reference phase is performed when a difference between the target VCT phase and the reference phase is equal to or smaller than a predetermined value.

18. The variable valve timing control apparatus according to claim 11, wherein the target VCT phase is set in accordance with an operation state of the engine.

19. The variable valve timing control apparatus according to claim 11, wherein the electronic control unit is further configured to at least:

change the target VCT phase to the reference phase to the reference phase upon a determination that there is the learning requirement of the reference phase, and learn the reference phase upon change of the target VCT phase to the reference phase.

20. The variable valve timing control apparatus according to claim 19, wherein the electronic control unit is further configured to at least:

determine whether a condition for permitting a learning of the reference phase is met by determining whether the target VCT phase is changed to the reference phase, wherein a learning of the reference phase is executed when the condition for permitting a learning of the reference phase is met and when there is the learning requirement of the reference phase.

* * * * *